(12) United States Patent
Venturati

(10) Patent No.: US 10,088,141 B2
(45) Date of Patent: Oct. 2, 2018

(54) LIGHT ASSEMBLY FOR PRODUCING SCENOGRAPHIC EFFECTS

(71) Applicant: CLAY PAKY S.p.A., Seriate (IT)

(72) Inventor: Carlo Venturati, Cividate al Piano (IT)

(73) Assignee: CLAY PAKY S.P.A., Seriate (IT)

( * ) Notice: Subject to any disclaimer, the term of this patent is extended or adjusted under 35 U.S.C. 154(b) by 110 days.

(21) Appl. No.: 15/228,201

(22) Filed: Aug. 4, 2016

(65) Prior Publication Data
US 2017/0038048 A1 Feb. 9, 2017

(30) Foreign Application Priority Data
Aug. 7, 2015 (IT) .................. 102015000043449

(51) Int. Cl.
| | |
|---|---|
| *F21V 25/04* | (2006.01) |
| *F21V 21/15* | (2006.01) |
| *F21V 23/00* | (2015.01) |
| *F21V 23/04* | (2006.01) |
| *H02P 29/024* | (2016.01) |
| *H02P 3/22* | (2006.01) |
| *H02P 8/30* | (2006.01) |
| *H02P 8/40* | (2006.01) |

(52) U.S. Cl.
CPC .............. *F21V 25/04* (2013.01); *F21V 21/15* (2013.01); *F21V 23/003* (2013.01); *F21V 23/04* (2013.01); *H02P 3/22* (2013.01); *H02P 8/30* (2013.01); *H02P 8/40* (2013.01); *H02P 29/025* (2013.01)

(58) Field of Classification Search
CPC ........ F21V 25/04; F21V 21/15; F21V 23/003; F21V 23/04; F21V 25/00; F21V 25/02; F21V 23/00; H02P 3/22; H02P 8/30; H02P 8/40; H02P 29/025; F21W 2131/406

See application file for complete search history.

(56) References Cited

U.S. PATENT DOCUMENTS

| | | | |
|---|---|---|---|
| 2007/0145937 A1 | 6/2007 | Hansen | |
| 2008/0100253 A1 | 5/2008 | Kiyamura | |
| 2009/0058333 A1 | 3/2009 | Okada | |
| 2009/0268466 A1* | 10/2009 | Allegri | F21S 10/007 362/268 |
| 2016/0305644 A1* | 10/2016 | Quadri | F21V 21/22 |
| 2017/0059133 A1* | 3/2017 | Campetella | F21V 5/04 |

* cited by examiner

Primary Examiner — Bao Q Truong
(74) Attorney, Agent, or Firm — Leason Ellis LLP

(57) ABSTRACT

A light assembly for producing scenographic effects comprising: at least one movable member; at least one electric motor coupled to the at least one movable member; at least one driving circuit, configured to drive the at least one electric motor and having a driving outlet connected to the electric motor; a driving inlet connected to the driving circuit to provide electric power and comprising a first driving terminal and a second driving terminal; and a supply inlet configured to receive electric power from an electric power supply; and a braking system configured to restrain unwanted movements of the movable member and comprising a switch having a first switching terminal and a second switching terminal respectively connected to the first driving terminal and to the second driving terminal; wherein the switch is configured to switch between a first operating configuration, in which the first switching terminal and the second switching terminal are disconnected; and a second operating configuration, in which the first switching terminal and the second switching terminal are connected.

19 Claims, 5 Drawing Sheets

LIGHT ASSEMBLY FOR PRODUCING SCENOGRAPHIC EFFECTS

CROSS-REFERENCE TO RELATED PATENT APPLICATIONS

The present application claims the benefit of priority under 35 U.S.C. § 119 of Italian patent application serial No. 102015000043449, filed Aug. 7, 2015, which is hereby incorporated by reference in its entirety.

TECHNICAL FIELD

The present invention relates to a light assembly for producing scenographic effects, in particular a scenographic projector.

A scenographic projector is used in the entertainment industry to produce scenographic effects by using light beams.

BACKGROUND OF THE INVENTION

Generally, a light assembly comprises at least one movable member; a lighting unit for generating a light beam; at least one electric motor to move the at least one movable member; and at least one driving circuit of the electric motor to drive the electric motor. The movable member can be defined by the head of the light assembly that houses the lighting unit and that is moved by two electric motors, one for the pan movement and another for the tilt movement; or it can be defined by another element housed inside the head and movable with respect to the head, e.g. the zoom lens housed in the projector head and movable with respect to the lighting unit. Usually, a light assembly comprises a plurality of movable members, for example of the aforesaid type.

When the light assembly is not in use, it can be damaged due to the unwanted movements of the movable members. For example, collisions may occur between the head and objects outside of the light assembly or against other fixed parts of the light assembly. The movable members housed inside the head, e.g. the zoom lens, can be damaged due to unwanted movements that cause collisions between said movable members and other components housed in the head.

In the known art, mechanical braking systems are known to lock the movable members of the light assembly in a certain position. Unfortunately, these braking systems have the disadvantage of being very heavy and expensive.

SUMMARY OF THE INVENTION

It is therefore an object of the present invention to provide a light assembly for producing scenographic effects having smaller drawbacks than the known art.

In accordance with the present invention, it is provided a light assembly for producing scenographic effects comprising:

at least one movable member;
at least one electric motor coupled to the at least one movable member;
at least one driving circuit, configured to drive the at least one electric motor and having a driving outlet connected to the electric motor;
a driving inlet connected to the driving circuit to provide electric power and comprising a first driving terminal and a second driving terminal; and
a supply inlet configured to receive electric power from an electric power supply; and
a braking system configured to restrain unwanted movements of the movable member and comprising a switch having a first switching terminal and a second switching terminal, respectively connected to the first driving terminal and to the second driving terminal;
wherein the switch is configured to switch between a first operating configuration, in which the first switching terminal and the second switching terminal are disconnected; and a second operating configuration, in which the first switching terminal and the second switching terminal are connected.

In other words, in the first operating configuration, the first switching terminal and the second switching terminal do not short-circuit together, while in the second operating configuration, the first switching terminal and the second switching terminal short-circuit together.

Thanks to the present invention, the movement of the at least one movable member can be braked, on the basis of the events, by acting on the driving inlet to short-circuit it in order to use the electric motor as a brake.

In accordance with a preferred embodiment of the present invention, the light assembly includes a plurality of movable members; at least one electric motor for each movable member to move the respective movable member; at least one driving circuit for each electric motor, each driving circuit having a driving outlet connected to the respective electric motor and being connected to the driving inlet.

Thanks to the present invention, the switch acts on the driving circuits of the electric motors associated with the movable members, and can brake the movement of said movable members in a simple and economic way. In other words, there is only a driving inlet common to all the driving circuits. Consequently, a single switch can act on the plurality of driving circuits of the movable members and brake their movements, thus obtaining a very simple and economical braking system.

In accordance with a preferred embodiment of the present invention, the braking system includes a detection unit configured to detect an electric value of the light assembly and to control the switch based on the detected electric value; the detection unit being preferably connected to the supply inlet to detect the electric value at the supply inlet.

Thanks to the present invention, the braking system acts when the light assembly is not in use and is not powered.

In accordance with a preferred embodiment of the present invention, the switch takes the second operating configuration to restrain unwanted movements of the at least one movable member when the detected electric value is smaller than or equal to a threshold value; the threshold value preferably varying according to a hysteresis cycle.

In accordance with another preferred embodiment of the present invention, the switch closes an electric path which includes a portion of the electric motor and at least one free-wheeling diode of the driving circuit to brake unwanted movements of the at least one movable member in the second operating configuration.

In accordance with another preferred embodiment of the present invention, the detected electric value is an electric voltage preferably detected at the supply inlet, or an electric current preferably detected at the supply inlet.

In accordance with an embodiment of the present invention, the switch has a third switching terminal connected to the supply inlet for electrically connecting the supply inlet to the driving inlet and for providing electric power at the driving inlet in the first operating configuration; the switch taking the first operating configuration when the detected electric value is greater than a threshold value.

In accordance with an embodiment of the present invention, the light assembly comprises a lighting unit, wherein the electric power supply is configured to supply electric power to the lighting unit.

In accordance with another preferred embodiment of the present invention, the light assembly includes a plurality of driving circuits and the electric motor comprises a plurality of windings; each driving circuit being coupled to a respective winding; the driving inlet being connected to the driving circuits; the switch preferably short-circuiting each winding upstream of the driving circuit in the second operating configuration.

In a preferred embodiment of the present invention, the braking system is arranged between the supply inlet and the driving circuit.

In a preferred embodiment of the present invention, the braking system is connected to the electric motor through the driving circuit.

In a preferred embodiment of the present invention, the driving circuit is connected to the supply inlet through the braking system.

In a preferred embodiment of the present invention, the driving circuit is arranged between the electric motor and the braking system.

Another object of the present invention is to provide a control method of a light assembly for producing scenographic effects which reduces the drawbacks of the prior art.

According to an embodiment, it is provided a control method of a light assembly for producing scenographic effects; the light assembly including at least one movable member; at least one electric motor coupled to the at least one movable member; a driving inlet having a first driving terminal and a second driving terminal; and at least one driving circuit connected to the driving inlet and configured to receive electric power to drive the at least one electric motor; the at least one driving circuit comprising a driving outlet connected to the at least one electric motor; the method comprising the steps of: moving the movable member by means of the electric motor in a first operating mode; and braking unwanted movements of the movable member in a second operating mode; in which braking comprises coupling the first driving terminal and the second driving terminal.

In a preferred embodiment of the present invention, the light assembly includes a plurality of movable members; at least one electric motor for each movable member to move the respective movable member; at least one driving circuit for each electric motor, each driving circuit being connected to the driving inlet and having a driving outlet connected to the respective electric motor.

In a preferred embodiment of the present invention, the light assembly comprises a supply inlet configured to receive electric power from an electric power supply; the method comprising the steps of detecting an electric value of the light assembly; and selecting the first or the second operating mode based on the detected electric value; the detecting step is preferably performed at the supply inlet.

In a preferred embodiment of the present invention, the method comprises the step of selecting the second mode when the detected electric value is smaller than or equal to a threshold value; the threshold value preferably varying according to a hysteresis cycle.

In a preferred embodiment of the present invention, the method comprises defining a closed path for electric charges comprising a portion of the electric motor and at least one free-wheeling diode of the driving circuit for braking unwanted movements of the at least one movable member in the second operating mode.

In a preferred embodiment of the present invention, the method comprises the step of selecting the first operating mode when the detected electric value is greater than a threshold value.

BRIEF DESCRIPTION OF THE DRAWINGS

Further characteristics and advantages of the present invention will become clear from the following description of non-limiting embodiments, with reference to the figures of the accompanying drawings, in which.

DETAILED DESCRIPTION OF THE INVENTION

Figure 1:
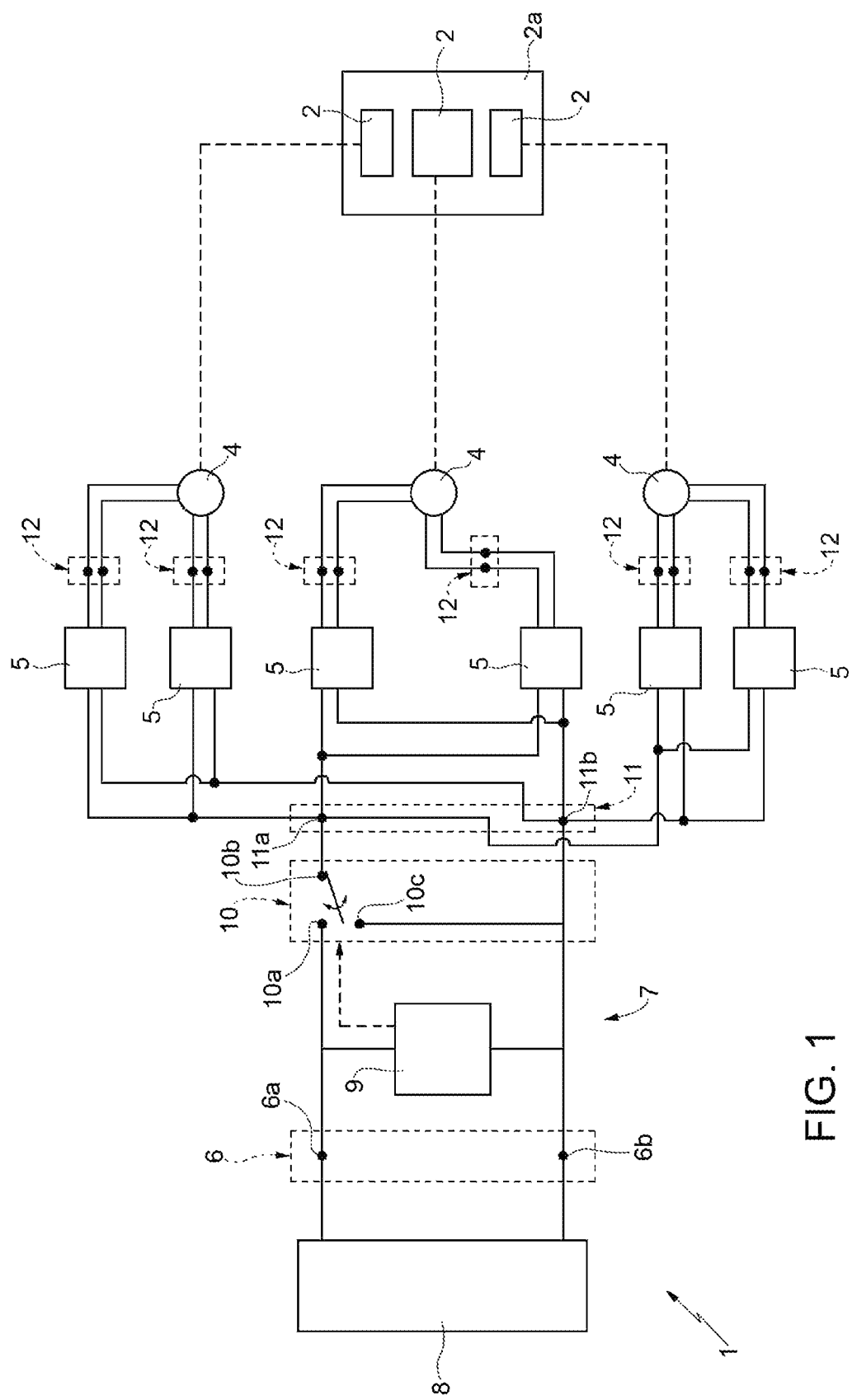
FIG. 1 is a schematic view, with parts removed for clarity's sake, of a light assembly for producing scenographic effects according to a first embodiment of the present invention.

FIG. 1 indicates with the reference number 1a light assembly for producing scenographic effects comprising a plurality of movable members 2, including a head 2a and other components housed in the head 2a; a lighting unit 3 (FIG. 2) housed in the head 2a for generating a light beam along an optical axis; at least one plurality of electric motors 4 to move the movable members 2; a plurality of driving circuits 5 connected to the electric motors 4; a driving inlet 11 having two driving terminals 11a and 11b, and connected to the plurality of driving circuits 5; a supply inlet 6 configured to receive electric power and having two supply terminals 6a and 6b; and a braking system 7.

Moreover, the light assembly 1 is configured to receive electric power from an electric power supply 8, in particular a direct current power supply.

Figure 2:
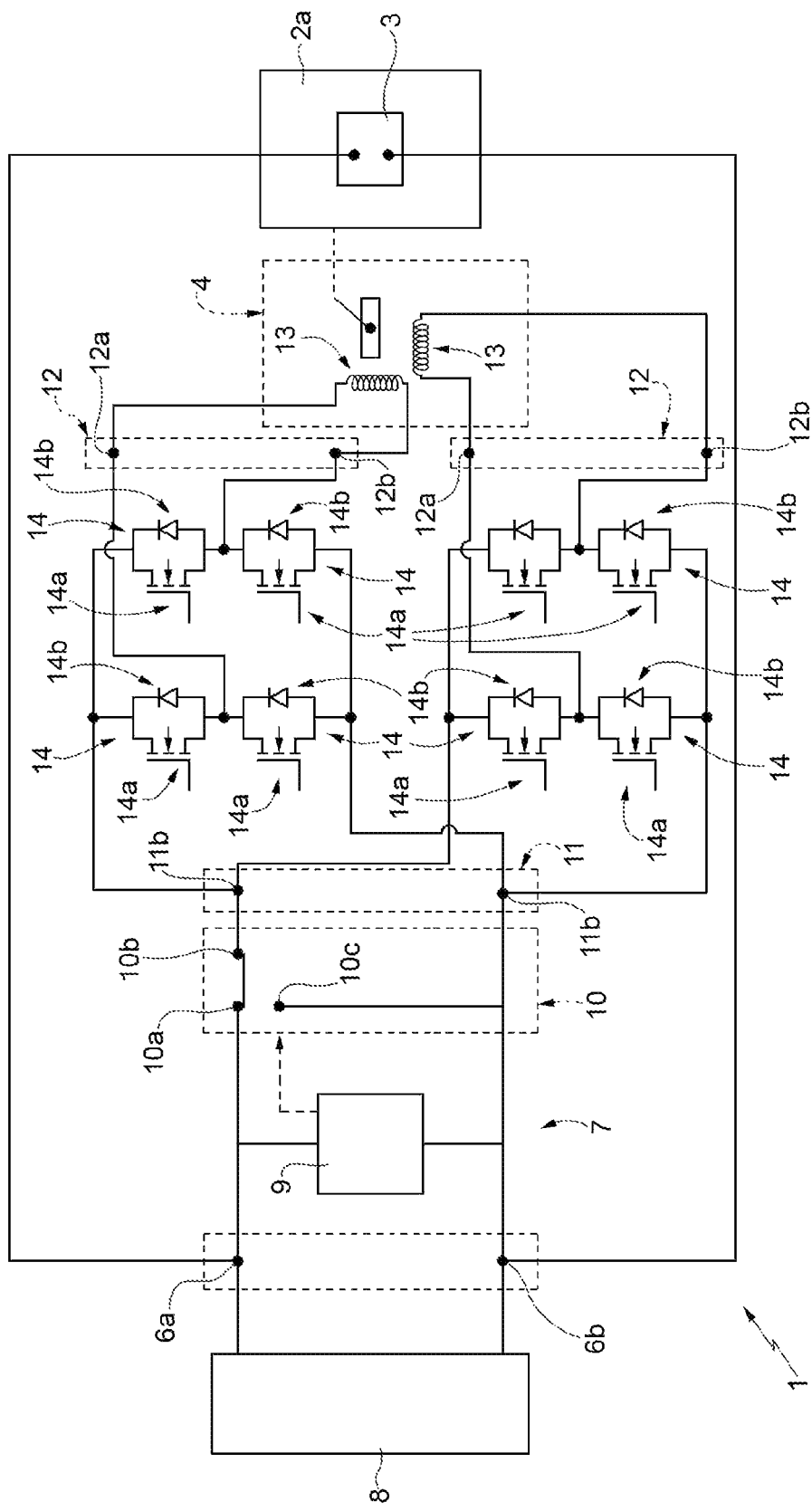
FIG. 2 is a schematic view, with some parts in detail and some parts removed for clarity's sake, of the light assembly of FIG. 1 in a first operating configuration.
Figure 3:
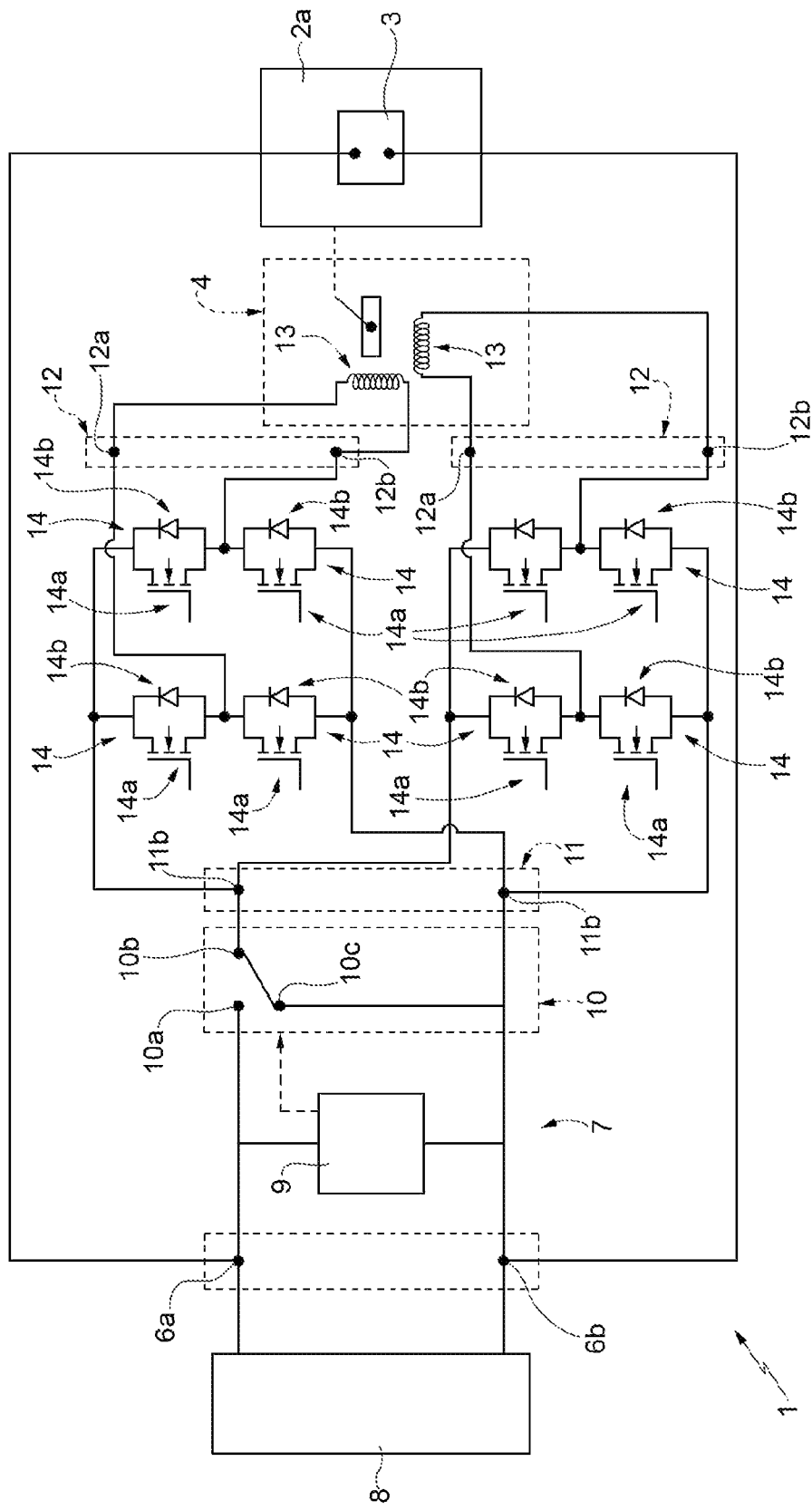
FIG. 3 is a schematic view, with some parts in detail and some parts removed for clarity's sake, of the light assembly of FIG. 1 in a second operating configuration.

Furthermore, the electric power supply 8 supplies electric power to the lighting unit 3. With reference to FIGS. 2 and 3, the supply inlet 6 is connected to the lighting unit 3. In another embodiment not shown in the attached figures, the electric power supply 8 supplies electric power to the lighting unit 3 through terminals different from those connected to the supply inlet 6.

With reference to FIGS. 1 to 3, the braking system 7 is arranged between the supply inlet 6 and the plurality of driving circuits 5. In more detail, the supply inlet 6 and the plurality of driving circuits 5 are connected by the braking system 7.

With reference to FIGS. 1, 2 and 3, each driving circuit 5 has a driving outlet 12 having two terminals 12a and 12b and being connected to the respective electric motor 4.

The braking system 7 includes a detection unit 9; and a switch 10.

The detection unit 9 is connected to the supply terminals 6a and 6b and detects an electric value at the supply inlet 6. In more detail, the detected electric value is an electric voltage present between the supply terminals 6a and 6b of the supply inlet 6. In an alternative embodiment of the present invention, the detected electric value is a current flowing between the supply terminals 6a and 6b of the supply inlet 6. In an alternative embodiment, the detected electric value is a current flowing through the windings of the electric motors 4. In another alternative embodiment, the detected electric value is the current flowing between the driving terminals 11a and 11b.

The switch 10 selectively connects the supply inlet 6 to the driving inlet 11. Accordingly, the switch 10 is interposed between the supply inlet 6 and the driving inlet 11.

In more detail, the switch 10 has three switching terminals 10a, 10b and 10c. The switching terminal 10a is connected to the supply inlet 6, in particular to the supply terminal 6a. The switching terminal 10b is connected to the driving inlet 11, in particular to the driving terminal 11a. The switching terminal 10c is connected to the driving inlet 11, in particular to the driving terminal 11b. Furthermore, the switching terminal 10c is also connected to the supply terminal 6b of the supply inlet 6.

The switch 10 can take two operating configurations: a first operating configuration in which it electrically connects the switching terminal 10a to the switching terminal 10b, in particular short-circuits the switching terminal 10a with the switching terminal 10b; and a second operating configuration in which it electrically connects the switching terminal 10b to the switching terminal 10c, in particular short-circuits the switching terminal 10b with the switching terminal 10c. Therefore, in the first operating configuration, the switch 10 connects the supply inlet 6 to the driving inlet 11, in particular the supply terminal 6a to the driving terminal 11a. In the second operating configuration, the switch 10 short-circuits the driving inlet 11, in particular, it electrically connects the driving terminal 11a to the driving terminal 11b.

The braking system 7 controls the switch 10 in the first operating configuration when the detection unit 9 detects an electric value at the supply inlet 6 greater than a threshold value. The braking system 7 controls the switch 10 in the second operating configuration when the detection unit 9 detects an electric value at the supply inlet 6 smaller than or equal to a threshold value. The threshold value varies according to a hysteresis cycle in order to filter the fast variations of the detected value around the predetermined value.

In another embodiment of the present invention, the threshold value generically varies according to the operating conditions of the light assembly 1. In another embodiment of the present invention, the braking system 7 uses a plurality of threshold values.

The switch 10 and the detection unit 9 can be both defined by an electromechanical system such as a relay, or by electronic devices, which can be driven, for example, by a plurality of transistors controlled by a control unit, e.g. a microprocessor.

In an embodiment not shown in the attached figures, the detection unit is not present and the switch 10 is controlled directly by an external signal to take the first or the second operating configuration.

In the non-limiting example of the present invention shown in FIGS. 1-3, the electric motors 4 are stepper motors.

With reference to FIGS. 2 and 3, a single electric motor 4 is shown for greater clarity. Each driving circuit 5 is connected to one of the stator windings 13 of the electric motor 4. Furthermore, FIGS. 2 and 3 show for greater clarity only the head 2a as a movable member 2. In more detail, each driving outlet 12 is connected to a stator winding 13. FIGS. 2 and 3 show by way of a non-limiting example an electric motor 4 with two windings 13. It is implicit that the present invention extends to a stepper motor having any number of windings 13.

With reference to FIGS. 2 and 3, the electric motor 4 is mechanically connected to the head 2a and is configured to move the head 2a around a pan or a tilt axis.

With reference to FIG. 1, the other electric motors 4 are connected to the other movable members 2 that, in the non-limiting example shown in FIG. 1, are housed in the head 2a. Accordingly, the movable members 2 are movable with respect to the head 2a, which is movable too.

FIGS. 2 and 3 show for greater clarity only one electric motor 4 to move the head 2a. It is implicit that the present invention extends to a light assembly 1 having a number of electric motors 4 larger than one, in particular two electric motors 4, the one to move the head 2a along the pan axis and the other to move the head 2a along the tilt axis. In the embodiment with two or more motors, each electric motor 4 is connected to a respective plurality of driving circuits 5, each plurality of driving circuits 5 is dedicated to the respective electric motor 4.

With reference to FIGS. 2 and 3, each driving circuit 5 comprises a plurality of switching units 14, in particular, four switching units 14 connected to each other between the driving terminals 11a and 11b and the terminals 12a and 12b with a H-bridge configuration so that the electric current selectively flows in the respective winding 13 in the desired direction according to the desired movement of the electric motor 4. Each switching unit 14 comprises a controlled switch 14a, in particular a power MOSFET, in FIGS. 2 and 3 a N-channel power MOSFET; and a passive free-wheeling switch 14b, in particular a power free-wheeling diode 14b connected to the controlled switch 14a to prevent the formation of a negative voltage higher than a given threshold on the controlled switch 14a. Furthermore, the passive free-wheeling switch 14b can be defined by a parasitic diode of the power MOSFET, therefore already incorporated in the power MOSFET. In other words, the switching unit 14 can be formed by a controlled switch, which includes a passive free-wheeling switch. Furthermore, the controlled switches 14a may be defined by any power transistor, be it a P-channel or an N-channel, such as e.g. P-channel MOSFETs, N-channel MOSFETs, BJT transistors of NPN or PNP type, IGBT transistors.

With reference to FIGS. 1 to 3, when the light assembly 1 is in use, the electric power supply 8 supplies electric power to the supply inlet 6 of the light assembly 1. Accordingly, the detection unit 9 detects an electric value that is greater than a threshold value and the switch 10 is operated in the first operating configuration in which it connects the supply inlet 6 to the driving inlet 11, thus providing electric power to the electric motor 4 through the driving circuits 5.

In a preferred, non-limiting embodiment of the present invention, the threshold value is a percentage of the fully operational electric value when the light assembly 1 is in use. In particular, in the preferred and non-limiting embodiment of the present invention, if the electric value is the electric voltage, the threshold will be a percentage of the power voltage at the supply inlet 6 when the light assembly 1 is in use. If the electric value is an electric current, in a preferred and non-limiting embodiment of the present invention, the threshold value will be zero, in other words the detection unit 9 detects whether the electric current value is positive or negative. In this case, the electric current can be detected at the supply inlet 6, or between one or more driving outlets 12 and the respective windings 13 or between the driving terminals 11a and 11b. In another embodiment, the detection unit 9 detects two electric values and compares them with respective threshold values, in other words the detection unit 9 detects both the electric voltage and the electric current and compares them with respective threshold values.

With reference to FIG. 3, when the light assembly 1 is not in use, the electric power supply 8 does not provide electric power to the supply inlet 6 and, consequently, the detection unit 9 detects an electric value that is smaller than or equal to the threshold value. In this case, the switch 10 is controlled in the second operating configuration, in which it short-circuits the driving inlet 11. As a result, all driving circuits 5 are short-circuited upstream. In this way, the windings 13 of the electric motor 4 are connected in short circuit through the respective passive free-wheeling switches 14b of the switching units 14. In other words, the switch 10 determines the formation of electric paths for the electric charges, each of which includes the respective stator winding 13, extends along portions of the driving circuits 5, in particular through the respective passive free-wheeling switches 14b. All electric paths are closed by the switch 10 through the switching terminals 10b and 10c. This creates a path for the electric charges developed on the windings 13 due to unwanted movements of the head 2a. Thanks to the fact that the switch 10 short-circuits all the windings 13 of the electric motor 4, the electric motor 4 acts as a brake and brakes the external, unwanted movements of the head 2a. Furthermore, in the second operating configuration, the switch 10 isolates the supply inlet 6 from the driving circuit 5.

With reference to FIG. 1, the driving inlet 11 is shared by all the driving circuits 5 of the electric motors 4 of the movable members. As a result, when the switch 10 is in the second operating configuration, as in FIG. 3, it short-circuits all the windings 13 of the electric motor 4 through the respective driving circuits 5. In this way, the electric motors 4 act as a brake and brake the movements of the movable members 2.

Figure 4:
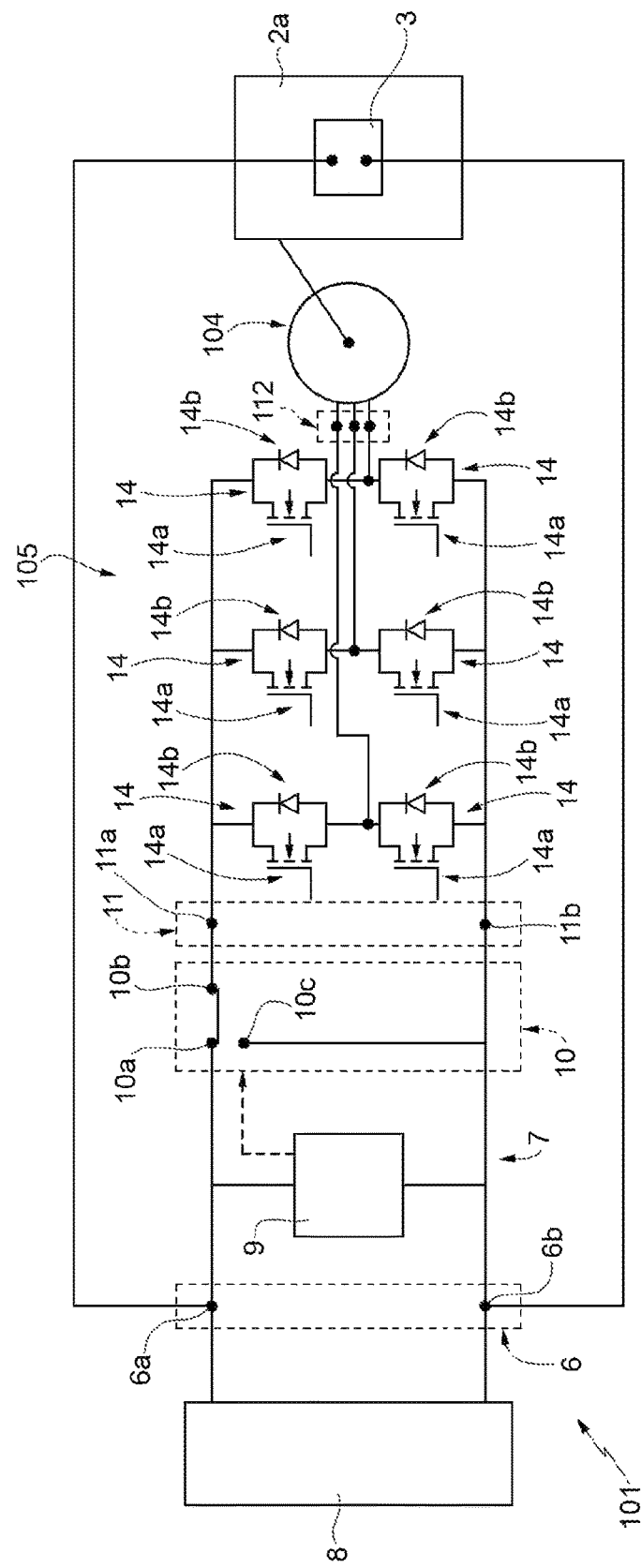
FIG. 4 is a schematic view, with parts removed for clarity's sake, of a light assembly for producing scenographic effects made according to a second embodiment of the present invention and in a first operating configuration.

In FIG. 4, the number 101 indicates a light assembly alternative to the light assembly 1, in which the same components are indicated with the same numbers of the light assembly 1. The light assembly 101 differs from the light assembly 1 in that it includes an electric motor 104 different from the electric motor 4. The electric motor 104 has a permanently magnetized rotor and is a three-phase electric motor, in particular synchronous.

In particular, the present invention extends to any electric motor with permanent magnets.

Moreover, the light assembly 101 includes a driving circuit 105 which is a three-phase bridge for the electric motor 104 comprising a plurality of switching units 14, each of which comprises a controlled switch 14a and a passive free-wheeling switch 14b. Furthermore, the driving circuit 105 includes a driving outlet 112 connected to the electric motor 104. In another embodiment not shown in the attached figures, the light assembly 101 includes another electric motor 104 and another driving circuit 105. The driving circuit 105 is connected to the driving inlet 11. In the present embodiments, when the electric power supply 8 supplies electric power to the light assembly 101, the detection unit 9 detects an electric value greater than a certain threshold and the switch 10 is controlled in the first operating configuration in which it connects the supply inlet 6 to the driving inlet 11, in particular it connects the supply terminal 6a to the driving terminal 11a. From the driving inlet 11, the electric power is supplied to the electric motor 104 or to the electric motors 104 through respective driving circuits 5. When the electric power supply 8 does not provide electric power to the light assembly 101, the unit detection 9 detects that the electric value at the terminals 6a, 6b is smaller than a threshold value, and the switch is controlled in the second operating configuration, in which it short-circuits upstream the driving circuit 105 or the driving circuits 105, in particular it short-circuits the driving inlet 11, in other words connects the driving terminals 11a and 11b. In the second operating configuration, the windings of the electric motor 104 or of the electric motors 104 are short-circuited through the free-wheeling diodes 14b of the respective driving circuit 105. Accordingly, the electric motor 104 acts as a brake, braking the unwanted movements of the head 2a.

Figure 5:
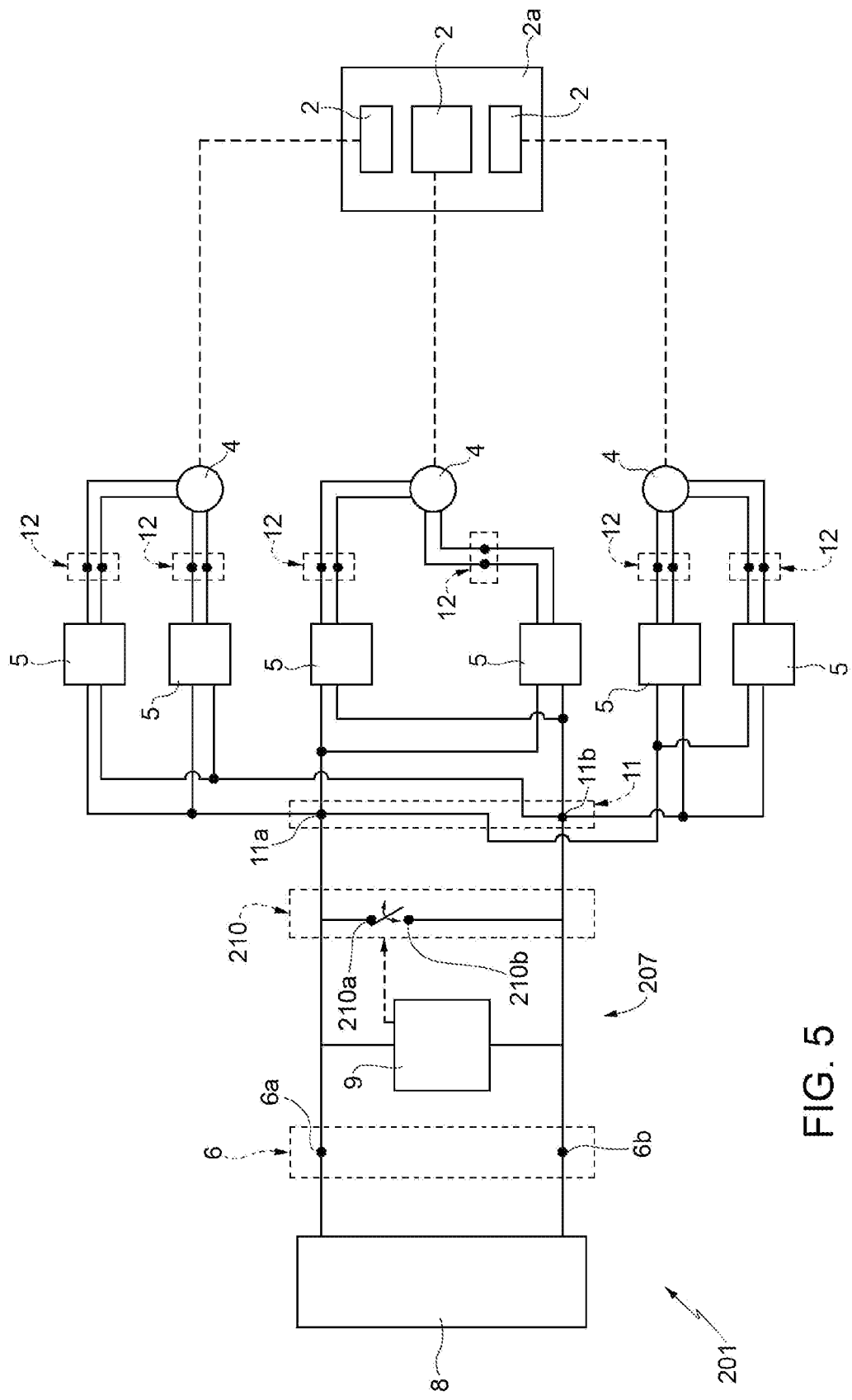
FIG. 5 is a schematic view, with parts removed for clarity's sake, of a light assembly for producing scenographic effects made according to a third embodiment of the present invention and in a first operating configuration.

With reference to FIG. 5, the number 201 indicates a light assembly alternative to the light assembly 1, in which the same components are indicated with the same numbers of the light assembly 1. The light assembly 201 differs from the light assembly 1 since the supply inlet 6 and the driving inlet 11 are directly and permanently connected. The braking system 207, which replaces the braking system 7, includes the detection unit 9 connected to the terminals 6a and 6b of the supply inlet 6 and a switch 210 connected in parallel to the driving inlet 11, so as to be able to short-circuit the driving inlet 11 in the second operating configuration. In more detail, the switch 210 includes a switching terminal 210a and a switching terminal 210b. The switching terminal 210a is connected to the driving terminal 11a, the switching terminal 210b is connected to the driving terminal 11b. Accordingly, the switch 210 is configured so as to be able to close the connection between the switching terminal 210a and the switching terminal 210b and to create a closed connection between the driving terminal 11a and the driving terminal 11b of the driving inlet 11.

Finally, it is evident that the light assembly here described can be subject to modifications and variations without departing from the scope of the appended claims.

The invention claimed is:

1. A light assembly for producing scenographic effects comprising:
    at least one movable member (2);
    at least one electric motor (4; 104) coupled to the at least one movable member (2);
    at least one driving circuit (5; 105), configured to drive the at least one electric motor (4; 104), and having a driving outlet (12; 112) connected to the electric motor (4; 104);
    a driving inlet (11) connected to the driving circuit (5; 105) for providing electric power and comprising a first driving terminal (11a) and a second driving terminal (11b); and
    a supply inlet (6) configured to receive electric power from an electric power supply (8); and
    a braking system (7; 207) configured to restrain unwanted movements of the movable member (2), and comprising a switch (10; 210) having a first switching terminal and a second switching terminal (10b, 10c; 210a, 210b) respectively connected to the first driving terminal and to the second driving terminal (11a, 11b);
wherein the switch (10; 210) is configured to switch between a first operating configuration, in which the first switching terminal (10*b*; 210*b*) and the second switching terminal (10*c*; 210*a*) are disconnected; and a second operating configuration, in which the first switching terminal (10*b*; 210*a*) and the second switching terminal (10*c*; 210*b*) are connected.

2. The light assembly according to claim 1, comprising a plurality of movable members (2); at least one electric motor (4; 104) for each movable member (2) for moving a respective movable member (2); at least one driving circuit (5; 105) for each electric motor (4; 104), each driving circuit (5; 105) having a driving outlet (12; 112) connected to the respective electric motor (4; 104) and being connected to the driving inlet (11).

3. The light assembly according to claim 1, wherein the braking system (7; 207) comprises a detection unit (9) configured to detect an electric value of the light assembly (1; 101; 201), and to control the switch (10; 210) based on the detected electric value; the detection unit (9) being preferably connected to the supply inlet (6) to detect the electric value at the supply inlet (6).

4. The light assembly according to claim 3, the switch (10; 210) taking the second operating configuration for braking unwanted movements of the at least one movable member (2) when the detected electric value is smaller than or equal to a threshold value; the threshold value preferably varying according to a hysteresis cycle.

5. The light assembly according to claim 1, wherein the switch (10; 210) closes an electric path, which comprises a portion of the electric motor (4) and at least one free-wheeling diode (14*b*) of the driving circuit (5; 105) for braking unwanted movements of the at least one movable member (2) in the second operating configuration.

6. The light assembly according to claim 3, wherein the detected electric value is an electric voltage preferably detected at the supply inlet (6), or an electric current preferably detected at the supply inlet (6).

7. The light assembly according to claim 4, wherein the switch (10) has a third switching terminal (10*a*) connected to the supply inlet (6) for electrically connecting the supply inlet (6) to the driving inlet (11) and for providing electric power to the driving inlet (11) in the first operating configuration; the switch (10) taking the first operating configuration when the detected electric value is greater than the threshold value.

8. The light assembly according to claim 1, comprising a light assembly (3), wherein the electric power supply (8) is configured to supply electric power to the light assembly (3).

9. The light assembly according to claim 1, comprising a plurality of driving circuits (5) and wherein the electric motor (4) comprises a plurality of windings (13); each driving circuit (5) being coupled to a respective winding (13); the driving inlet (11) being connected to the driving circuits (5); the switch (10) preferably short-circuiting each winding (13) upstream of the driving circuit (5) in the second operating configuration.

10. The light assembly according to claim 1, wherein the braking system (7; 207) is arranged between the supply inlet (6) and the driving circuit (5; 105).

11. The light assembly according to claim 1, wherein the braking system (7; 207) is connected to the electric motor (4; 104) through the driving circuit (5; 105).

12. The light assembly according to claim 1, wherein the driving circuit (5; 105) is connected to the supply inlet (6) through the braking system (7; 207).

13. The light assembly according to claim 1, wherein the driving circuit (5; 105) is arranged between the electric motor (4; 104) and the braking system (7; 207).

14. A control method of a light assembly for producing scenographic effects; the light assembly (1; 101; 201) comprising at least one movable member (2); at least one electric motor (4; 104) coupled to the at least one movable member (2); a driving inlet (11) having a first driving terminal (11*a*) and a second driving terminal (11*b*); and at least one driving circuit (5; 105) connected to the driving inlet (11) for receiving electric power and configured to drive the at least one electric motor (4; 104); the at least one driving circuit (5; 105) comprising a driving outlet (12; 112) connected to the at least one electric motor (4; 104); the method comprising the steps of: moving the movable member (2) by means of the electric motor (4; 104) in a first operating mode and braking unwanted movements of the movable member (2) in a second operating mode; wherein braking comprises connecting the first driving terminal (11*a*) and the second driving terminal (11*b*).

15. The method according to claim 14, wherein the light assembly (1; 101; 201) comprises a plurality of movable members (2); at least one electric motor (4; 104) for each movable member (2) for moving the respective movable member (2); at least one driving circuit (5; 105) for each electric motor (4; 104), each driving circuit (5; 105) being connected to the driving inlet (11) and having a driving outlet (12; 112) connected to the respective electric motor (4; 104).

16. The method according to claim 14, wherein the light assembly (1; 101; 201) comprises a supply inlet (6) configured to receive electric power from an electric power supply (8); the method comprising the steps of detecting an electric value of the light assembly (1; 101; 201); and selecting the first or the second operating mode based on the detected electric value; the detecting step being preferably performed at the supply inlet (6).

17. The method according to claim 16, comprising the step of selecting the second operating mode when the detected electric value is smaller than or equal to a threshold value; the threshold value preferably varying according to a hysteresis cycle.

18. The control method according to claim 15, comprising the step of defining a closed electric path comprising a portion of the electric motor (4; 104) and at least one free-wheeling diode (14*b*) of the driving circuit (5; 105) for braking the unwanted movements of the at least one movable member (2) in the second operating mode.

19. The method according to claim 17, comprising the step of selecting the first operating mode when the detected electric value is greater than the threshold value.

\* \* \* \* \*